United States Patent Office 3,176,540
Patented Apr. 6, 1965

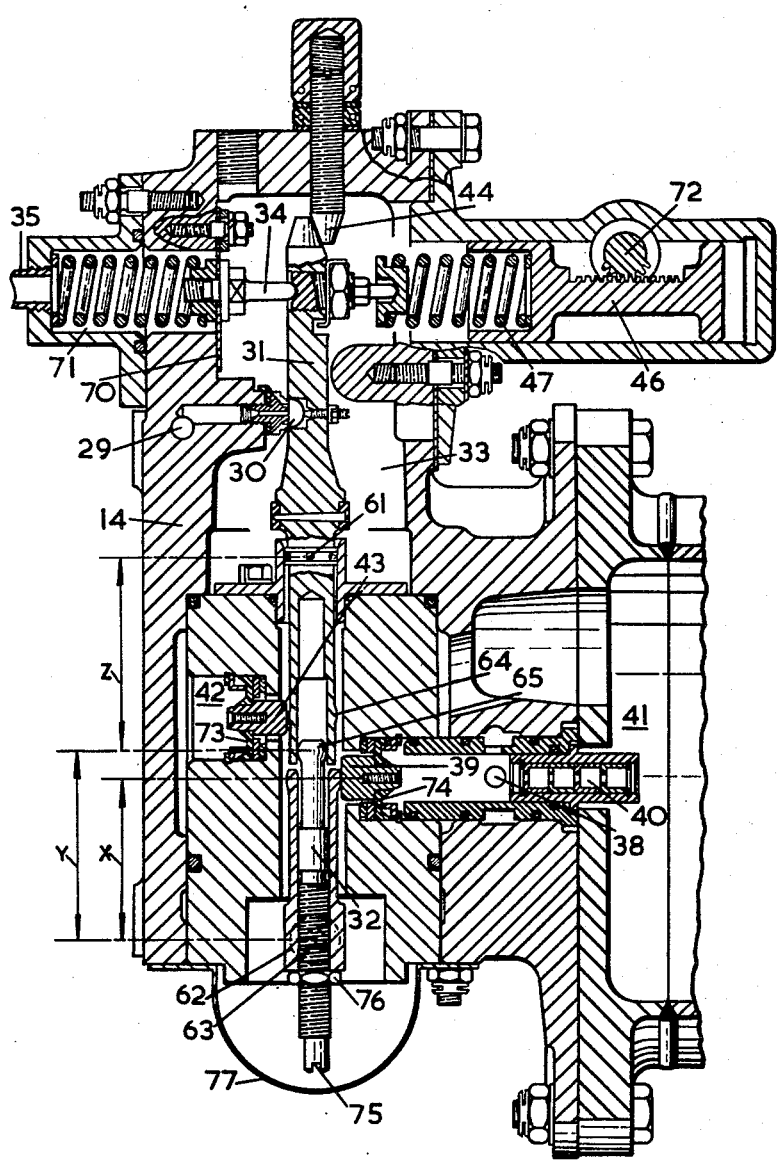

3,176,540
VALVE CONTROLLING MEANS FOR
A FUEL SYSTEM
Robert Henry Davis and Robin Michael Dakin, Coventry, England, assignors to Bristol Siddeley Engines Limited, Bristol, England
Filed May 23, 1963, Ser. No. 282,787
Claims priority, application Great Britain, June 6, 1962, 21,827/62
2 Claims. (Cl. 74—522)

The invention relates to a pivotally-mounted, valve-controlling arm for use in a fuel system and is particularly, but not exclusively, concerned with an arm carrying a half-ball valve. In fuel systems proposed hitherto, such an arm has been subjected to controlling forces applied at fixed distances from its pivotal axis; thus for any particular force applied, the moment of such force about the pivotal axis of the arm is constant.

Broadly, the prevent invention provides a pivotally-mounted, valve-controlling arm for a fuel system, the arm having means for applying a variable controlling force thereon at a position spaced from the axis of the pivot thereof and means for varying the effective distance of the line of action of the controlling force from the pivot axis, thereby to provide a means of adjustment.

According to one form of the invention, a valve-controlling arm comprises a first member, mounted on a pivot and carrying the valve, and a second member, engageable with one end of the first member and forming therewith a longitudinally-adjustable knuckle joint, the second member being longitudinally-adjustable with respect to a pivot therefor, the axis of the latter being spaced longitudinally from the axis of the pivot of the first member by a fixed distance, the second member also being engageable by means capable of applying a variable controlling force thereon, whereby the effective force applied by said means on said second member is applied to said first member through the knuckle joint and whereby axial adjustment of the second member with respect to its pivot will alter the value of said effective force and therefore of the resultant moment of said effective force about the pivotal axis of said first member.

Two composite valve-controlling arms according to this invention are employed in a fuel system for supplying gaseous fuel to a combustion chamber of a gas turbine power plant described in co-pending application No. 282,-708, filed May 23, 1963. One of the arms is referred to in that specification as the "acceleration control arm" and the other is referred to as the "governing control arm."

By way of example of the present invention, the governing control arm of the aforesaid fuel system will now be described with reference to the accompanying drawing showing a longitudinal section through the arm and its containing block. Like references have been used in this specification and in the specification of the said co-pending application.

Referring to the accompanying drawing, the arm comprises members 31, 32 and is contained in a block 14. The member 31 carries a half-ball valve 30, which controls the flow of oil from a pipe 29 into a cavity 33 in the block 14, where the pressure is lower than in the pipe 29. The member 31 is pivotally-mounted in the block at 61 and is arranged to be pivoted in the clockwise direction, when viewed as shown in the drawing, thereby opening the half-ball valve 30, by a member 34 carried on a diaphragm 70, responsive to a pressure signal applied to the interior of a chamber 71, through a pipe 35. This movement is opposed by a restraining spring 47, of which the compression can be adjusted by means of a correcting block 46, having a rack thereon engaged by a pinion 72, actuated by a corrector motor (not shown). A stop 44 is provided to limit the movement of the member 31 in the said clockwise direction. The lower end of the member 31, as viewed in the drawing, is engaged by a plunger 43, carried on a diaphragm 73, responsive to gas pressure in a chamber 42 communicating with a reservoir 41. The reservoir 41 is supplied with gaseous fuel through a passage 38 and a bank of restrictors 40 arranged in series one with another, the gaseous fuel being tapped from the fuel supply line to the combustion chamber of the gas turbine power plant.

The lower end portion of the member 31 is formed as a socket 64 and contains a bulbous end 65 of the member 32, which is longitudinally-adjustable in an internally-screw-threaded guide 62. The guide 62 is pivotally-mounted in the block 14 at 63 at a fixed distance from the pivot 61. The bulbous end 65 and the socket 64 together form a longitudinally-slidable knuckle joint. A further plunger 39 bears against the guide 62 adjacent its upper end, as viewed in the drawing, and hence causes the guide and the member 32 to pivot as a whole about the pivot 63. The plunger 39 is carried on a diaphragm 74, responsive to the gas pressure applied through the passage 38 and co-operates with the plunger 43 to control the movement of the composite arm and hence the opening or closing of the half-ball valve 30.

The lower end of the member 32 has a slot 75 formed therein, into which the blade of a screw-driver or like tool can be fitted, whereby the member 32 can be screwed into or out of the guide 62. The member 32 is locked in a position to which it has been set by a nut 76. The said lower end of the member 32 is then closed by a cover 77 bolted to the block 14.

Although the plunger 39 acts on the guide 62 and hence on the member 32, it will, in effect, act on the member 31. The said effective force acting on the member 31 will be:

$$P \cdot \frac{X}{Y}$$

where:

P is the force actually applied by the plunger 39,
X is the distance from the line of action of P to the axis of the pivot 63, and
Y is the distance between the line of action through the bulbous end 65 and the axis of the pivot 63.

Thus the resultant moment of the force P about the pivot of the member 31 will be:

$$P \cdot \frac{X}{Y} \cdot Z$$

where:

Z is the distance between the line of action through the bulbous end 65 and the axis of the pivot 61.

The distances X, Y and Z are shown in the drawing.

By turning the member 32 in the guide 62, the axial position of the bulbous end 65 in the socket 64 can be altered, thereby changing the values of Y and Z and thereby altering the value of the resultant moment of the force P about the pivot 61.

What we claim as our invention and desire to secure by Letters Patent of the United States is:

1. Apparatus for controlling the flow of fluid in a fuel system, the apparatus comprising a valve seat through which said fluid passes, a valve member co-operating with said valve seat to control the flow of said fluid therethrough, a valve-controlling arm carrying said valve member and means engaging said arm to apply a controlling force thereon, said arm comprising a pair of levers positioned end-to-end, interfitting and relatively-slidable adjacent ends on said levers, said adjacent ends engaging one with the other to form a longitudinally-adjustable knuckle joint therebetween, a first pivot on one of said levers, the other of said levers being of telescopic construction and comprising a pair of interfitting and longitudinally-adjustable portions, a second pivot on that portion of said other lever which is remote from said one lever, said first and second pivots being spaced apart by a fixed distance, said valve member being carried on said one lever and said means for applying said controlling force engaging the other of said levers, whereby adjustment of said other lever will effect adjustment of said knuckle joint and thereby the amount of movement of said valve member in response to movement of said means applying said controlling force.

2. Apparatus for controlling the flow of fluid in a fuel system, the apparatus comprising a valve seat through which said fluid passes, a valve member co-operating with said valve seat to control the flow of said fluid therethrough, a valve-controlling arm carrying said valve member and means engaging said arm to apply a controlling force thereon, said arm comprising a first lever carrying said valve member, a first pivot on said first lever, a second lever engaging with one end of said first lever and forming therewith a longitudinally-adjustable knuckle joint, a tubular guide surrounding said second lever, co-operating screw threads in said tubular guide and on said second lever, whereby said second lever is adjustable longitudinally within said tubular guide, a second pivot on said tubular guide, said first and second pivots being spaced apart by a fixed distance and said means for applying the controlling force engaging said tubular guide, whereby adjustment of said second lever in said tubular guide will effect adjustment of said knuckle joint and thereby the amount of movement of said valve member in response to movement of said means applying said controlling force.

References Cited by the Examiner
UNITED STATES PATENTS

| | | | |
|---|---|---|---|
| 586,563 | 7/97 | Parsons | 74—522 |
| 2,190,506 | 2/40 | Wurr | 74—522 |

BROUGHTON G. DURHAM, *Primary Examiner.*

MILTON KAUFMAN, *Examiner.*